United States Patent
Miyaji et al.

(10) Patent No.: US 12,009,683 B2
(45) Date of Patent: Jun. 11, 2024

(54) STANDBY POWER SUPPLY DEVICE AND METHOD FOR CHARGING SECONDARY BATTERY

(71) Applicant: SANYO Electric Co., Ltd., Daito (JP)

(72) Inventors: Shusuke Miyaji, Hyogo (JP); Shota Ogawa, Hyogo (JP); Toshiaki Ishikawa, Osaka (JP); Masayuki Kobayashi, Osaka (JP); Hidenori Tsuda, Hyogo (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 395 days.

(21) Appl. No.: 17/417,980

(22) PCT Filed: Dec. 19, 2019

(86) PCT No.: PCT/JP2019/049865
§ 371 (c)(1),
(2) Date: Jun. 24, 2021

(87) PCT Pub. No.: WO2020/137815
PCT Pub. Date: Jul. 2, 2020

(65) Prior Publication Data
US 2022/0069590 A1 Mar. 3, 2022

(30) Foreign Application Priority Data
Dec. 25, 2018 (JP) .................. 2018-241738

(51) Int. Cl.
*H01M 10/48* (2006.01)
*H02J 7/00* (2006.01)
(52) U.S. Cl.
CPC ............ *H02J 7/005* (2020.01); *H01M 10/48* (2013.01); *H02J 7/007188* (2020.01)

(58) Field of Classification Search
CPC ..... H02J 7/005; H02J 7/007188; H01M 10/48
(Continued)

(56) References Cited

U.S. PATENT DOCUMENTS

| | | | | |
|---|---|---|---|---|
| 3,886,427 A | * | 5/1975 | Long .................. | H02J 7/00302 320/156 |
| 4,097,792 A | * | 6/1978 | Calaway ........... | H02J 7/007184 320/156 |

(Continued)

FOREIGN PATENT DOCUMENTS

| | | | | |
|---|---|---|---|---|
| CN | 103390876 B | * | 2/2018 | ............. H02J 9/061 |
| JP | 01129724 A | * | 5/1989 | |

(Continued)

OTHER PUBLICATIONS

Hata et al., Japanese Patent Document No. JP-2014230389-A, published Dec. 8, 2014, 3 pages including abstract, claims and 1 drawing. (Year: 2014).*

(Continued)

*Primary Examiner* — Phallaka Kik
(74) *Attorney, Agent, or Firm* — WHDA, LLP (57) ABSTRACT

The standby power supply device includes one or more secondary batteries and a charging circuit that charges the secondary batteries. The charging circuit includes a voltage adjuster that controls the state of charge of the secondary batteries, and a controller that controls the voltage adjuster by detecting the degree of deterioration of the secondary batteries over time. In the charging circuit, the voltage adjuster charges the secondary batteries at a charge voltage lower than a full charge voltage of the secondary batteries to bring the secondary batteries into a load power supply standby state, and gradually increases the charge voltage of the secondary batteries according to the degree of deterioration of the secondary batteries detected by the controller.

6 Claims, 6 Drawing Sheets

(58) Field of Classification Search
USPC ....... 320/137, 125, 132, 133, 134, 135, 136, 320/155, 160, 164
See application file for complete search history.

(56) References Cited

U.S. PATENT DOCUMENTS

| | | | | |
|---|---|---|---|---|
| 4,382,221 | A * | 5/1983 | Reynolds | H02J 9/062 |
| | | | | 320/153 |
| 6,018,802 | A * | 1/2000 | Abe | H04N 1/32363 |
| | | | | 713/300 |
| 11,527,900 | B2 * | 12/2022 | Kim | H02J 7/00712 |
| 2005/0104565 | A1 * | 5/2005 | Nagaoka | H02M 3/158 |
| | | | | 323/222 |
| 2008/0084185 | A1 | 4/2008 | Nakazawa | |
| 2008/0224667 | A1 | 9/2008 | Tanaka et al. | |
| 2010/0156356 | A1 * | 6/2010 | Asakura | H01M 10/44 |
| | | | | 320/152 |
| 2012/0001595 | A1 * | 1/2012 | Maruyama | H02J 7/0016 |
| | | | | 320/118 |
| 2012/0112700 | A1 * | 5/2012 | Morimoto | H02J 7/007182 |
| | | | | 320/132 |
| 2013/0289854 | A1 * | 10/2013 | Takahashi | H02J 7/0069 |
| | | | | 701/112 |
| 2013/0314050 | A1 | 11/2013 | Matsubara et al. | |
| 2015/0367744 | A1 | 12/2015 | Saint-Marcoux et al. | |
| 2016/0036096 | A1 * | 2/2016 | Yoshida | H02J 7/0063 |
| | | | | 429/61 |
| 2016/0105041 | A1 * | 4/2016 | Henderson | H02J 7/0048 |
| | | | | 320/162 |
| 2017/0005488 | A1 * | 1/2017 | Suzuki | B60L 58/12 |
| 2017/0117721 | A1 * | 4/2017 | Toya | H02J 7/0013 |
| 2017/0126052 | A1 * | 5/2017 | Toki | H02J 7/04 |
| 2017/0279283 | A1 * | 9/2017 | Kim | H02J 7/0016 |
| 2021/0004882 | A1 * | 1/2021 | Nakajima | G06Q 50/10 |
| 2021/0313816 | A1 * | 10/2021 | Yamagami | H02J 7/0048 |
| 2021/0325475 | A1 * | 10/2021 | Bae | G01R 31/3835 |
| 2022/0294273 | A1 * | 9/2022 | Hamana | H02J 50/40 |
| 2023/0163626 | A1 * | 5/2023 | Chen | H02J 7/0029 |
| | | | | 307/66 |

FOREIGN PATENT DOCUMENTS

| | | | | |
|---|---|---|---|---|
| JP | 10145981 | A | * | 5/1998 |
| JP | 2000-023388 | A | | 1/2000 |
| JP | 2000023388 | A | * | 1/2000 |
| JP | 2000-270491 | A | | 9/2000 |
| JP | 2000270491 | A | * | 9/2000 |
| JP | 2008-228492 | A | | 9/2008 |
| JP | 2008-252960 | A | | 10/2008 |
| JP | 2009050085 | A | * | 3/2009 |
| JP | 2010130798 | A | * | 6/2010 |
| JP | 2012130249 | A | * | 7/2012 |
| JP | 2013-247003 | A | | 12/2013 |
| JP | 2014-230389 | A | | 12/2014 |
| JP | 2016-096696 | A | | 5/2016 |
| JP | 2016096696 | A | * | 5/2016 |

OTHER PUBLICATIONS

Maemura, Japanese Patent Document No. JP-2013236426-A, published Nov. 21, 2013, 3 pages including abstract, claims and 1 drawing. (Year: 2013).*

International Search Report dated Jan. 28, 2020, issued in counterpart application No. PCT/JP2019/049865 (2 pages).

The Extended European Search Report dated Jan. 19, 2022, issued in counterpart to EP Application No. 19902139.5. (7 pages).

Office Action dated Nov. 13, 2023, issued in counterpart EP Application No. 19902139.5. (6 pages).

* cited by examiner

STANDBY POWER SUPPLY DEVICE AND METHOD FOR CHARGING SECONDARY BATTERY

This application is a U.S. national stage application of the PCT International Application No. PCT/JP2019/049865 filed on Dec. 19, 2019, which claims the benefit of foreign priority of Japanese patent application No. 2018-241738 filed on Dec. 25, 2018, the contents all of which are incorporated herein by reference.

TECHNICAL FIELD

The present invention relates to a standby power supply device used as an uninterruptible power supply or an emergency power supply, and a method for charging a secondary battery included in the standby power supply device.

BACKGROUND ART

A power supply device including a secondary battery is used as a backup power supply at the time of a power failure or an emergency in a server or a data center. A conventional power supply device has a structure in which a built-in secondary battery is on standby in a fully charged state in order to unfailingly supply power to a system and protect data and the like at the time of instantaneous power interruption due to power failure or the like. Thus, deterioration of the secondary battery that is held in a fully charged state for a long time is likely to be promoted.

For this reason, the secondary battery used in this type of power supply device needs to be replaced after a lapse of a certain period due to aged deterioration. Thus, when the secondary battery to be replaced deteriorates quickly, the period until replacement of the secondary battery is also shortened, and thus, it is desired to extend the life of the secondary battery. In order to extend the life, it is conceivable to reduce a load on the secondary battery.

On the other hand, an increase in output of the power supply device is also demanded. For example, in a backup power supply device, it is demanded to maintain high output discharge for a predetermined time, and the load on the secondary battery tends to increase. When the charge current increases, the heat generation of the secondary battery also increases, and the deterioration becomes severe, which affects the life.

CITATION LIST

Patent Literature

PTL 1: Unexamined Japanese Patent Publication No. 2013-247003
PTL 2: Unexamined Japanese Patent Publication No. 2008-252960
PTL 3: Unexamined Japanese Patent Publication No. 2008-228492

SUMMARY OF THE INVENTION

An object of the present invention is to provide a standby power supply device capable of suppressing a load applied to a secondary battery and extending a battery life, and a method for charging a secondary battery.

A standby power supply device according to an aspect of the present invention includes one or more secondary batteries 1 and charging circuit 2 that charges secondary batteries 1. Charging circuit 2 includes voltage adjuster 3 that controls the state of charge of secondary batteries 1, and controller 4 that controls voltage adjuster 3 by detecting the degree of deterioration of secondary batteries 1 over time. In charging circuit 2, voltage adjuster 3 charges secondary batteries 1 at charge voltage Vc lower than full charge voltage Vf of secondary batteries 1 to bring secondary batteries 1 into a load power supply standby state, and gradually increases charge voltage Vc of secondary batteries 1 according to the degree of deterioration of secondary batteries 1 detected by controller 4.

The standby power supply device having the above configuration is characterized in that the load applied to the secondary batteries is suppressed and the battery life can be extended. This is because the charging circuit of the standby power supply device described above includes a voltage adjuster that controls the state of charge of the secondary batteries and a controller that controls the voltage adjuster by detecting the degree of deterioration of the secondary batteries over time, and the voltage adjuster charges the secondary batteries at charge voltage Vc lower than full charge voltage Vf of the secondary batteries to bring the secondary batteries into a load power supply standby state, and gradually increases charge voltage Vc of the secondary batteries according to the degree of deterioration of the secondary batteries detected by the controller. The standby power supply device described above can reduce the load applied to the secondary batteries by charging the secondary batteries at charge voltage Vc lower than the full charge voltage, instead of charging to fully charge the secondary batteries at full charge voltage Vf at the beginning of use. Moreover, since the degree of deterioration of the secondary batteries is detected and charge voltage Vc is gradually increased according to the degree of deterioration of the secondary batteries, it is possible to prevent a reduction in charging capacity over time and to extend the battery life while securing the charging capacity requested for the standby power supply device.

Controller 4 of charging circuit 2 can detect the degree of deterioration of secondary batteries 1 from SOH of secondary batteries 1.

A standby power supply device according to another aspect of the present invention includes one or more secondary batteries 1 and charging circuit 2 that charges secondary batteries 1. Charging circuit 2 includes voltage adjuster 3 that controls the state of charge of secondary batteries 1, and controller 4 that controls voltage adjuster 3 by detecting a discharge standby time of secondary batteries 1. In controller 4, voltage adjuster 3 charges secondary batteries 1 at charge voltage Vc lower than full charge voltage Vf of secondary batteries 1 to bring secondary batteries 1 into a load power supply standby state, and gradually increases charge voltage Vc of secondary batteries 1 according to the discharge standby time of secondary batteries 1 detected by controller 4.

The standby power supply device having the above configuration is characterized in that the load applied to the secondary batteries is suppressed and the battery life can be extended. This is because the charging circuit of the standby power supply device described above includes a voltage adjuster that controls the state of charge of the secondary batteries and a controller that controls the voltage adjuster by detecting the discharge standby time of the secondary batteries, and the voltage adjuster charges the secondary batteries at charge voltage Vc lower than full charge voltage Vf of the secondary batteries to bring the secondary batteries into a load power supply standby state, and gradually increases charge voltage Vc of the secondary batteries according to the discharge standby time of the secondary batteries detected by the controller. The standby power supply device described above can reduce the load applied to the secondary batteries by charging the secondary batteries at charge voltage Vc lower than full charge voltage Vf, instead of charging to fully charge the secondary batteries at full charge voltage Vf at the beginning of use. Moreover, since charge voltage Vc is gradually increased according to the discharge standby time of the secondary batteries, it is possible to prevent a reduction in charging capacity over time and to extend the battery life while securing the charging capacity requested for the standby power supply device.

Moreover, in the standby power supply device of the present invention, charging circuit 2 can charge secondary batteries 1 with a power amount exceeding a load request power amount requested by a load connected to the standby power supply device to bring secondary batteries 1 into a load power supply standby state.

In the present specification, the load request power amount means a power amount requested for the standby power supply device as a minimum power amount necessary for driving the load connected to the standby power supply device for a predetermined time at the time of a power failure or an emergency.

With the above configuration, since the secondary batteries are charged with the power amount necessary for driving the load connected to the standby power supply device for the predetermined time to be in the load power supply standby state, and therefore the load can be unfailingly driven by supplying the power necessary for the load for the predetermined time at the time of a power failure or an emergency, and the system, data, and the like of the load can be unfailingly protected.

A method for charging a secondary battery according to an aspect of the present invention is a method for charging secondary batteries 1 included in standby power supply device 100, the method including: detecting the degree of deterioration of secondary batteries 1 over time; and gradually increasing charge voltage Vc of secondary batteries 1 according to the detected degree of deterioration within a range lower than full charge voltage Vf of secondary batteries 1.

The method for charging a secondary battery described above is characterized in that the load applied to the secondary batteries is suppressed and the battery life can be extended. This is because the charging method described above detects the degree of deterioration of the secondary batteries over time; and gradually increases charge voltage Vc of the secondary batteries according to the detected degree of deterioration within a range lower than full charge voltage Vf of the secondary batteries. The charging method described above can reduce the load applied to the secondary batteries by charging the secondary batteries at charge voltage Vc lower than full charge voltage Vf, instead of charging the secondary batteries at full charge voltage Vf at the beginning of use. Moreover, since charge voltage Vc is gradually increased according to the degree of deterioration of the secondary batteries within a range lower than full charge voltage Vf, it is possible to prevent a reduction in charging capacity over time and to extend the battery life while securing the charging capacity requested for the standby power supply device.

Moreover, the method for charging a secondary battery can detect the degree of deterioration of secondary batteries 1 from SOH of secondary batteries 1.

A method for charging a secondary battery according to another aspect of the present invention is a method for charging secondary batteries 1 included in standby power supply device 100, the method including: detecting the discharge standby time of secondary batteries 1; and gradually increasing charge voltage Vc of secondary batteries 1 according to the detected discharge standby time within a range lower than full charge voltage Vf of secondary batteries 1.

The method for charging a secondary battery described above is characterized in that the load applied to the secondary batteries is suppressed and the battery life can be extended. This is because the charging method described above detects the discharge standby time of the secondary batteries; and gradually increases charge voltage Vc of the secondary batteries according to the detected discharge standby time within a range lower than full charge voltage Vf of the secondary batteries. The charging method described above can reduce the load applied to the secondary batteries by charging the secondary batteries at charge voltage Vc lower than full charge voltage Vf, instead of charging the secondary batteries at full charge voltage Vf at the beginning of use. Moreover, since charge voltage Vc is gradually increased according to the discharge standby time of the secondary batteries within a range lower than full charge voltage Vf, it is possible to prevent a reduction in charging capacity over time and to extend the battery life while securing the charging capacity requested for the standby power supply device.

Moreover, the method for charging a secondary battery can charge secondary batteries 1 with a power amount exceeding a load request power amount requested by a load to which power is supplied from secondary batteries 1 to bring secondary batteries 1 into a load power supply standby state.

According to the above method, since the secondary batteries are charged with the power amount necessary for driving the load to which the power is supplied from the secondary batteries for the predetermined time to be in the load power supply standby state, and therefore the load can be unfailingly driven by supplying the power necessary for the load for the predetermined time at the time of a power failure or an emergency, and the system, data, and the like of the load can be unfailingly protected.

DESCRIPTION OF EMBODIMENTS

Hereinafter, exemplary embodiments of the present invention will be described on the basis of the drawings. However, exemplary embodiments described below are an example for embodying the technical idea of the present invention, and the present invention is not limited to the following. Further, in the present specification, members indicated in the claims are not limited to the members of the exemplary embodiments. In particular, the dimensions, materials, shapes, and the relative arrangements of the components described in the exemplary embodiments are not intended to limit the scope of the present invention thereto unless otherwise specified, and are merely illustrative examples. The sizes and positional relationships of members shown in the drawings may be exaggerated for clarity of description. Further, in the following description, the same names and reference numerals indicate the same or similar members, and detailed description will be appropriately omitted. Moreover, each element constituting the present invention may be configured such that a plurality of elements is configured by the same member and one member also serves as a plurality of elements, or conversely, the function of one member can be shared and achieved by a plurality of members.

Standby Power Supply Device 100

Figure 1:
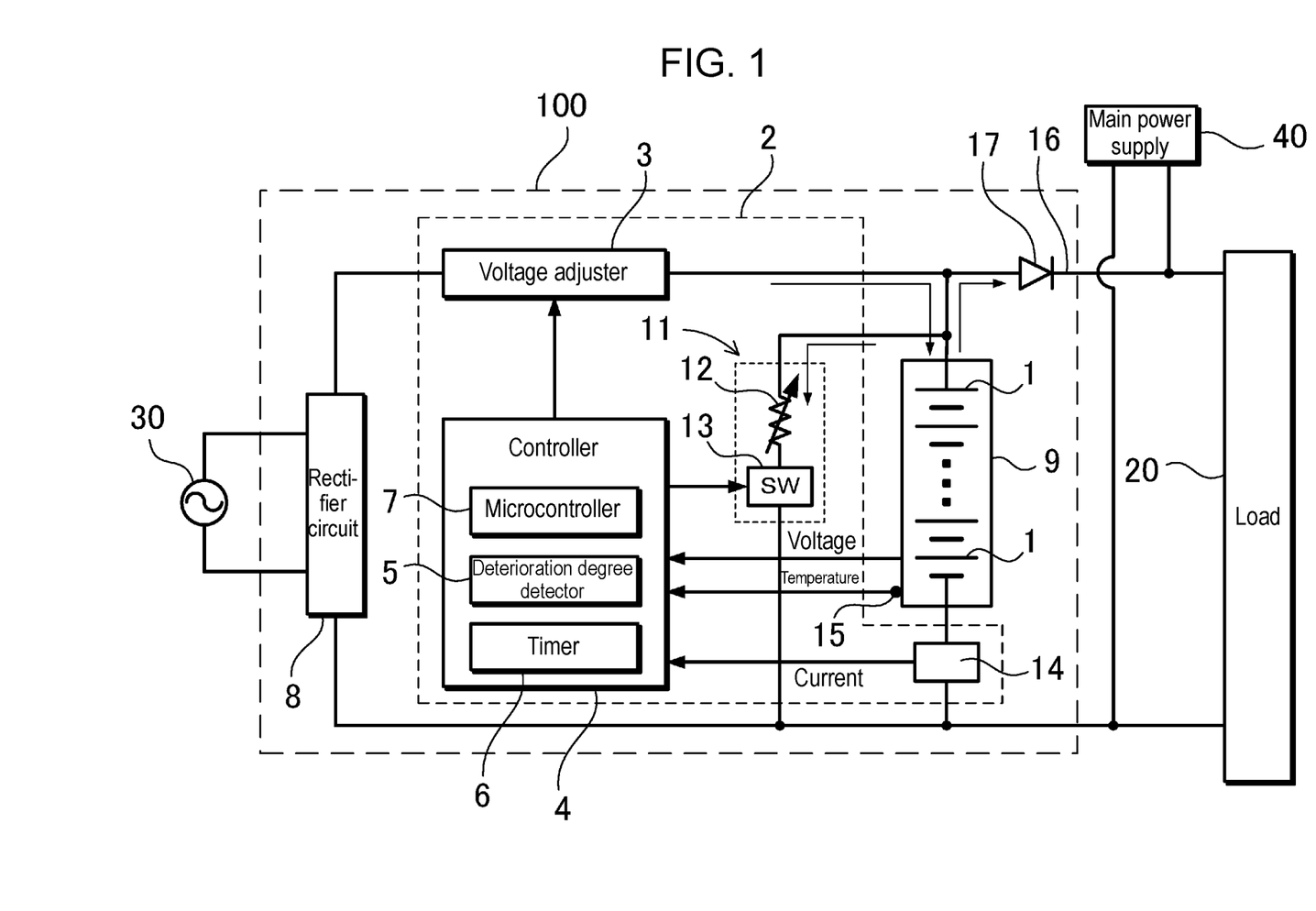
FIG. 1 is a schematic block diagram of a standby power supply device according to an exemplary embodiment of the present invention.

FIG. 1 is a block diagram showing standby power supply device 100 according to an exemplary embodiment of the present invention. Standby power supply device 100 includes rectifier circuit 8, charging circuit 2, and battery unit 9 to which one or more secondary batteries 1 are connected. Charging circuit 2 includes voltage adjuster 3 that controls the state of charge of secondary batteries 1, and controller 4 that controls voltage adjuster 3. Voltage adjuster 3 is a member for controlling the state of charge of secondary batteries 1. Controller 4 is a member for controlling voltage adjuster 3 by detecting the degree of deterioration of secondary batteries 1 over time. This voltage adjuster 3 is configured to charge secondary batteries 1 at charge voltage Vc lower than full charge voltage Vf of these secondary batteries 1 to bring secondary batteries 1 into a load power supply standby state, and gradually increase charge voltage Vc of secondary batteries 1 according to the degree of deterioration of secondary batteries 1 detected by controller 4.

In standby power supply device 100, commercial power supply 30 is connected to the input, and load 20 to which the power is supplied is connected to the output. Main power supply 40 is connected to an input of load 20 to which standby power supply device 100 is connected, and in a normal state, drive power is supplied from main power supply 40 to drive load 20. An output of standby power supply device 100 is connected in parallel to an output of main power supply 40, and when the drive power is not supplied from main power supply 40 due to a power failure or the like, the power is promptly supplied from standby power supply device 100 to load 20.

(Load 20)

The load to be used includes, for example, a device that is requested to be supplied with power for a predetermined time in a state where the supply power is interrupted such as a power failure. As an example, there is a server, a computer, or the like that requires time to back up data or terminate the system when the supply power is interrupted. Alternatively, it is also used in an aspect in which it is not preferable that the supply power is interrupted during reading or writing of data. In this case, time for storing data or shutting down the system is required. Therefore, in a state where the supply power is interrupted, power supply for securing a time required for such work is required. In other words, it is only required that a standby power supply device is charged with such a power amount that a request power amount can be supplied. Alternatively, it is sufficient if a power supply of another system such as a private power generator or another high-capacity backup power supply is prepared and necessary power can be supplied until the power supply is switched to such a power supply of another system within a predetermined time after a power failure is detected. As described above, the standby power supply device is not necessarily required to have a high capacity, and it is sufficient if the standby power supply device can normally store data or shut down, or supply power until the power supply is switched to the power supply of another system (for example, about several minutes), in other words, the standby power supply device can guarantee an operation within a predetermined time. Therefore, it is not necessary to fully charge battery unit 9 included in standby power supply device 100, and it is sufficient to secure the minimum necessary capacity.

Specifically, as load 20 connected to standby power supply device 100, typically, a server, a data center, an electronic device such as a computer or a hard disk, or the like is used. These loads 20 are devices having an extremely large adverse effect caused by interruption of the operating power supplied from main power supply 40 due to a power failure, an instantaneous power interruption in which a power failure instantaneously occurs, or the like. In order to protect the system and data in such a case, drive power for normally executing an operation such as executing a backup operation or switching to a reserve power supply is required for a predetermined time. Therefore, standby power supply device 100 supplies a load request power amount requested for load 20 as a minimum power amount necessary for driving load 20 connected to standby power supply device 100 for a predetermined time at the time of a power failure or an emergency.

The charging method of the standby power supply device includes a step of charging secondary batteries 1 with charging circuit 2 at first charge voltage V1 lower than full charge voltage Vf of secondary batteries 1, and a step of charging by changing the charge voltage of secondary batteries 1 to second charge voltage V2 that is higher than first charge voltage V1 determined in advance according to characteristics of secondary batteries 1 after a lapse of a predetermined period. Thus, deterioration of secondary batteries 1 can be suppressed, and the expected life in a high-temperature environment can be improved.

(Operation of Standby Power Supply Device 100)

Next, the operation of standby power supply device 100 shown in FIG. 1 will be described. Standby power supply device 100 includes battery unit 9 to which one or more secondary batteries 1 are connected and charging circuit 2 that charges secondary batteries 1 in order to supply drive power to externally connected load 20 in an emergency such as a power failure. Charging circuit 2 includes voltage adjuster 3 that controls the state of charge of secondary batteries 1, and controller 4 that controls voltage adjuster 3. Voltage adjuster 3 charges secondary batteries 1 at charge voltage Vc lower than full charge voltage Vf of secondary batteries 1 to bring secondary batteries 1 into a load power supply state where power can be supplied to load 20.

(Controller 4)

On the other hand, controller 4 detects the degree of deterioration of secondary batteries 1 over time or detects the discharge standby time of secondary batteries 1, and controls voltage adjuster 3 to gradually increase charge voltage Vc of secondary batteries 1 according to the degree of deterioration or the discharge standby time of secondary batteries 1 detected by controller 4. Controller 4 in FIG. 1 detects the degree of deterioration of secondary batteries 1 over time using deterioration degree detector 5. The degree of deterioration of secondary batteries 1 detected by controller 4 can be detected from, for example, a state of health (SOH) of secondary batteries 1.

Controller 4 calculates the degree of deterioration of secondary batteries 1, and charges by changing charge voltage Vc of secondary batteries 1 to second charge voltage V2 higher than first charge voltage V1 according to the deterioration amount. Thus, deterioration of secondary batteries 1 can be suppressed, and the expected life in a high-temperature environment can be improved.

Further, the charging method of the standby power supply device may further include a step of calculating the degree of deterioration of secondary batteries 1 with controller 4 and charging by changing the charge voltage of secondary batteries 1 to third charge voltage V3 higher than second charge voltage V2 according to the deterioration amount. Thus, it is possible to finely adjust the balance between the load request power amount and the charge voltage by controlling the charge voltage more finely and to further extend the life.

As described above, the degree of deterioration of secondary batteries 1 can be typically deterioration capacity SOH of secondary batteries 1. When deterioration capacity SOH of secondary batteries 1 decreases by a predetermined value or more, controller 4 may change charge voltage Vc of secondary batteries 1 to second charge voltage V2 higher than first charge voltage V1. Alternatively, when the difference between deterioration capacity SOH of secondary batteries 1 and a necessary capacity becomes a predetermined value or less, controller 4 may change the charge voltage of secondary batteries 1 to second charge voltage V2 higher than first charge voltage V1.

The method of detecting the degree of deterioration of secondary batteries 1 over time and increasing the charge voltage based on the value has been described above. However, the present invention is not limited to this method, and the deterioration of the secondary batteries may be predicted in advance without detecting the degree of deterioration of the secondary batteries, and the charge voltage may be changed according to the lapse of time.

Charging circuit 2 detects the degree of deterioration of secondary batteries 1 over time and gradually increases charge voltage Vc of secondary batteries 1 according to the detected degree of deterioration within a range lower than full charge voltage Vf of secondary batteries 1. That is, at the beginning of use of secondary batteries 1, charging circuit 2 charges charge voltage Vc of secondary batteries 1 at first charge voltage V1 lower than full charge voltage Vf of secondary batteries 1. At this time, secondary batteries 1 are not fully charged, but are charged with a predetermined capacity that can supply a larger power amount than the request power amount requested for the load. Standby power supply device 100 charges with a power amount of 100 Wh, for example, so as to be able to supply power of 180 seconds with power of 2000 W. For example, in a load in which the power consumption is 2000 W and the time required for work such as backup at the time of a power failure is 180 seconds, a power amount of 100 Wh is required for a series of work, and thus the request power amount in the electronic device is 100 Wh. Therefore, charging circuit 2 determines charge voltage Vc so as to be able to charge with a power amount greater than 100 Wh.

In standby power supply device 100, a plurality of secondary batteries 1 is connected in multiple series and multiple parallel to form battery unit 9 in order to supply a predetermined amount of power amount.

Controller 4 in FIG. 1 includes microcontroller 7, deterioration degree detector 5, and timer 6. Microcontroller 7 controls voltage adjuster 3. Deterioration degree detector 5 detects the degree of deterioration of secondary batteries 1 over time. For this reason, temperature sensor 15 that detects the temperature of secondary batteries 1, current detector 14 that detects a charge and discharge current, voltage detector (not shown), and the like are provided around secondary batteries 1. On the other hand, timer 6 is a member for measuring a lapse of time, and measures, for example, an elapsed time from the start of use of secondary batteries 1. Microcontroller 7 detects the remaining capacity and voltage of secondary batteries 1 and controls voltage adjuster 3 such that secondary batteries 1 are controlled to be able to hold a predetermined remaining capacity. Microcontroller 7 controls voltage adjuster 3 to charge secondary batteries 1 at predetermined charge voltage Vc lower than full charge voltage Vf. Secondary batteries 1 are charged at charge voltage Vc lower than full charge voltage Vf, so that secondary batteries 1 are charged to a charge amount that can be charged at charge voltage Vc without being fully charged.

Controller 4 controls voltage adjuster 3 to charge secondary batteries 1 at predetermined charge voltage Vc. When controller 4 detects the voltage and the remaining capacity of secondary batteries 1 and detects that the voltage and the remaining capacity of secondary batteries 1 decrease to a charge start value, microcontroller 7 switches voltage adjuster 3 to the charging state to charge secondary batteries 1. When the remaining capacity of secondary batteries 1 to be charged increases to a preset charge stop value, microcontroller 7 detects this state and controls voltage adjuster 3 to stop charging secondary batteries 1.

(Secondary Batteries 1)

Secondary batteries 1 are non-aqueous electrolyte secondary batteries, and for example, a lithium ion battery is used. Standby power supply device 100 shown in the drawing includes a plurality of secondary batteries 1 and the plurality of secondary batteries 1 is connected in multiple parallel and multiple series to form battery unit 9 so that a predetermined power amount can be supplied to load 20 in an emergency. Standby power supply device 100 can adjust the charge and discharge capacity by the number of secondary batteries 1 connected as battery unit 9. Therefore, standby power supply device 100 includes a number of secondary batteries 1 having the optimum capacity for the intended use. In standby power supply device 100 in which secondary batteries 1 are lithium ion batteries, for example, when 52 secondary batteries 1 are connected in 4 parallel and 13 series as battery unit 9, the output voltage can be increased and the current capacity can be increased. Secondary batteries 1 are set to a capacity capable of outputting, for example, power of 400 W to 3 kW to a power supply line of load 20, e.g., a server, continuously for two minutes to ten minutes. Standby power supply device 100 adjusts the number of secondary batteries 1 connected in series and in parallel so that power of, for example, 2.0 kW can be continuously supplied to load 20 for 180 seconds to several minutes.

Further, standby power supply device 100 shown in FIG. 1 includes rectifier circuit 8 that converts commercial power supply 30 to be input, for example, an alternating current having a frequency of 50 Hz or 60 Hz and a voltage of 100 V or 200 V into a direct current. Rectifier circuit 8 is connected to charging circuit 2.

(Charging Circuit 2)

Charging circuit 2 includes voltage adjuster 3 that controls the state of charge of secondary batteries 1, and controller 4 that controls voltage adjuster 3. Charging circuit 2 detects the remaining capacity of secondary batteries 1 based on the voltage output from voltage adjuster 3, starts charging when the remaining capacity becomes smaller than a setting capacity, and then, when secondary batteries 1 are charged with an electric capacity exceeding the load request power amount, detects this and stops charging.

Moreover, charging circuit 2 detects the degree of deterioration of secondary batteries 1 over time, adjusts charge voltage Vc for charging secondary batteries 1 according to the detected degree of deterioration or detects the discharge standby time of secondary batteries 1, and adjusts charge voltage Vc for charging secondary batteries 1 according to the detected discharge standby time or adjusts charge voltage Vc according to both the degree of deterioration and the discharge standby time.

(Voltage Adjuster 3)

Voltage adjuster 3 converts the direct current output from rectifier circuit 8 into a direct current having a predetermined voltage and charges secondary batteries 1. For example, a DC/DC converter can be used as voltage adjuster 3. Although not shown, the DC/DC converter includes, in addition to a switching element that is a transistor or an FET that switches direct current input from rectifier circuit 8, a control circuit that switches on and off of the switching element at a frequency higher than a commercial power supply, for example, a frequency higher than 100 kHz, a high-frequency transformer that is connected on a primary side to the switching element, a rectifier circuit that is connected to the secondary side of the high-frequency transformer, and the like. In the DC/DC converter, the direct current input from rectifier circuit 8 is input to the high-frequency transformer by switching on and off of the switching element. The high-frequency transformer steps down an input alternating current having a high frequency to a predetermined voltage. The switching element is switched on and off by the control circuit. The DC/DC converter feeds back an output voltage to the control circuit, controls a duty ratio for switching on and off of the switching element, and adjusts the output voltage to predetermined charge voltage Vc. The control circuit is controlled by microcontroller 7 of controller 4 to adjust the output voltage.

With standby power supply device 100 described above, the output from secondary batteries 1 is supplied to load 20 via output line 16 in a state where the power supply from commercial power supply 30 is stopped, such as a power failure. In this structure, the power supply is switched to the power supply from secondary batteries 1 at the same time as the power supply is stopped, so that adverse effects such as instantaneous power interruption can be unfailingly prevented. In standby power supply device 100 in the drawing, diode 17 that prevents backflow is connected to output line 16 on the output of secondary batteries 1.

However, in the standby power supply device, an output switch may be provided in the output line from the secondary batteries, and power may be supplied from the secondary batteries to the load by switching the output switch to an ON state at the time of a power failure. The standby power supply device includes a power failure detection circuit that detects a power failure state, and when the power failure detection circuit detects a power failure, the output switch is switched on to supply power from the secondary batteries to the load.

Standby power supply device 100 described above is in the load power supply standby state in which a predetermined power amount is stored in secondary batteries 1 in a state where operating power is normally supplied from main power supply 40 to load 20. Further, standby power supply device 100 supplies the operating power from secondary batteries 1 to load 20 in a state where the operating power is not supplied from main power supply 40 to load 20, that is, at the time of a power failure or an emergency of commercial power supply 30.

Standby power supply device 100 of the present invention performs the operation described below to supply power to load 20.

A. State in which Power is Normally Supplied from Main Power Supply 40 to Load 20

In this state, standby power supply device 100 stands by as the load power supply standby state in a state where secondary batteries 1 are charged with a predetermined 9 power amount.

When the remaining capacity of secondary batteries 1 decreases, charging of secondary batteries 1 is started, and it stands by in a state where the load request power amount can be always supplied to load 20.

At this time, voltage adjuster 3 holds secondary batteries 1 in a state of being charged at predetermined charge voltage Vc.

A. State in which Power Supply from Main Power Supply 40 to Load 20 is Interrupted When the power supply from main power supply 40 to the load is interrupted due to a power failure or the like, a direct current of a rated voltage is output from secondary batteries 1 to load 20.

With standby power supply device 100, deterioration of secondary batteries 1 can be suppressed by charging with only a necessary discharge power capacity. A conventional backup power supply is operated with the charge voltage of the secondary batteries being fixed to full charge voltage Vf (for example, 4.0 V/cell). However, in the application of the backup power supply, since the time during which each secondary battery stands by in a fully charged state is long, there is a problem that deterioration is promoted while the charge voltage remains high. On the other hand, with standby power supply device 100 according to the present exemplary embodiment, the charge voltage is set to charge voltage Vc lower than full charge voltage Vf according to the deterioration of secondary batteries 1. For example, it is set to a value lower than the conventional full charge voltage Vf=4.0 V/cell, for example, 3.7 V/cell. By intentionally suppressing the initial charge voltage of secondary batteries 1 in this manner, it is possible to suppress deterioration of secondary batteries 1 and extend the expected life. Further, as a result of being able to extend the life, it becomes possible to cope with operation at a higher temperature than the conventional temperature environment and high temperature storage.

Here, initial charge voltage Vc is intentionally set low to such an extent that the requested discharge power of the load can be satisfied. Then, when initial charge voltage Vc cannot satisfy the request due to capacity deterioration, charge voltage Vc is increased. By such control, charge voltage Vc, which is one of the main factors promoting the capacity deterioration of secondary batteries 1, can be kept low, and the life can be extended. Further, with the realization of the long life, in a case where the life is the same as the conventional life, it is possible to cope with a higher temperature environment than the conventional case.

(Charging Method of the Power Supply Device According to Example 1)

Figure 2:
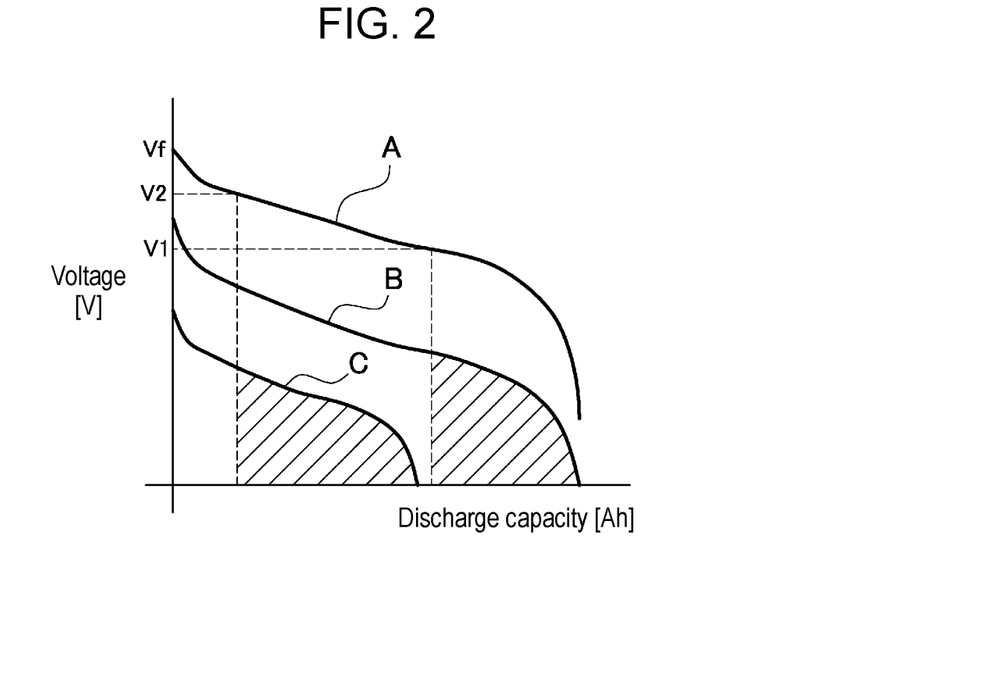
FIG. 2 is a graph showing a relationship between a discharge capacity and a voltage of a secondary battery.

Hereinafter, a charging method for charging standby power supply device 100 according to Example 1 to a predetermined necessary capacity or more will be described on the basis of FIGS. 2 to 10. The graph of FIG. 2 shows a relationship between a discharge capacity and an open circuit voltage of secondary batteries 1. In general, a discharge curve of the secondary batteries shows a discharge characteristic as shown by curve A in the drawing. That is, as the discharge progresses and the discharge capacity increases, the open circuit voltage of the secondary batteries decreases. Further, as the secondary batteries deteriorate, the chargeable capacity decreases. Curve B and curve C in the drawing simply show an image in which the electric capacity of the secondary batteries decreases as the deterioration progresses. Here, curve B indicates a curve of a discharge characteristic at the initial stage of use, and curve C indicates a curve of a discharge characteristic in a state where deterioration has progressed. In curve B and curve C, hatched areas correspond to the load request power amount requested by the load connected to the standby power supply device, and correspond to the necessary power amount required per cell. As shown in these graphs, the secondary batteries can be charged with a requested necessary power amount without necessarily being charged at a high charge voltage. In particular, with regard to the secondary batteries at the initial stage of use, as indicated by curve B in the drawing, the necessary power amount can be charged while the charge voltage is set to first charge voltage V1 lower than full charge voltage Vf. Further, even in the secondary batteries in which the deterioration has progressed, as indicated by curve C in the drawing, the charge voltage is set to second charge voltage V2 higher than first charge voltage V1, which is the initial charge voltage, so that the necessary power amount can be charged.

Conventionally, from the viewpoint of battery protection, the charge voltage is initially set high, and the charge voltage is lowered as the battery deteriorates. In particular, since the secondary batteries is maintained in a fully charged state, deterioration is occurred due to heat generation, and the capacity tends to decrease due to the progress of deterioration.

On the other hand, according to the charging method according to the exemplary embodiment, since the capacity of secondary batteries 1 is large in the initial state where there is little deterioration, the charge voltage is suppressed to be lower than full charge voltage Vf. For example, as indicated in curve B, the necessary power amount is charged by setting the charge voltage to V1. On the other hand, since the capacity decreases as the deterioration progresses, the charge voltage is made higher than V1 to secure the necessary power amount. For example, as indicated in curve C, the necessary power is secured by setting the charge voltage to V2. As described above, contrary to the conventional method, by increasing the charge voltage according to the deterioration, an excellent effect of extending the battery life is obtained.

Figure 3:
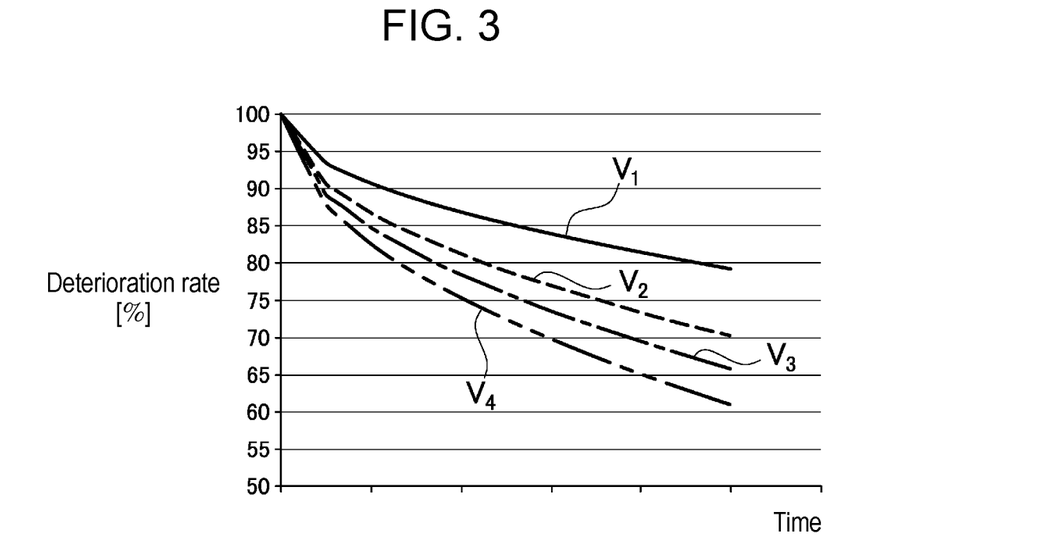
FIG. 3 is a graph showing a state in which a deterioration rate of a secondary battery decreases with time.

Deterioration of secondary batteries 1 can be alleviated by lowering the charge voltage and charging. For example, the graph shown in FIG. 3 shows a state in which deterioration rate SOH of secondary batteries 1 decreases with time for each charge voltage. In this drawing, curves V1 to V4 indicate deterioration rates SOH of secondary batteries 1 over time when the secondary batteries are charged at different charge voltages V1 to V4, respectively, and a relationship of V1<V2<V3<V4 is established in the magnitudes of these charge voltages V1 to V4. As shown in this drawing, the higher the charge voltage, the more remarkable the degree of deterioration. Conversely, it is found that deterioration of the battery is alleviated by lowering the charge voltage. That is, by intentionally lowering the charge voltage in the initial state, deterioration is suppressed and the life of secondary batteries 1 is extended.

(Charge Control According to Example 1)

Figure 4:
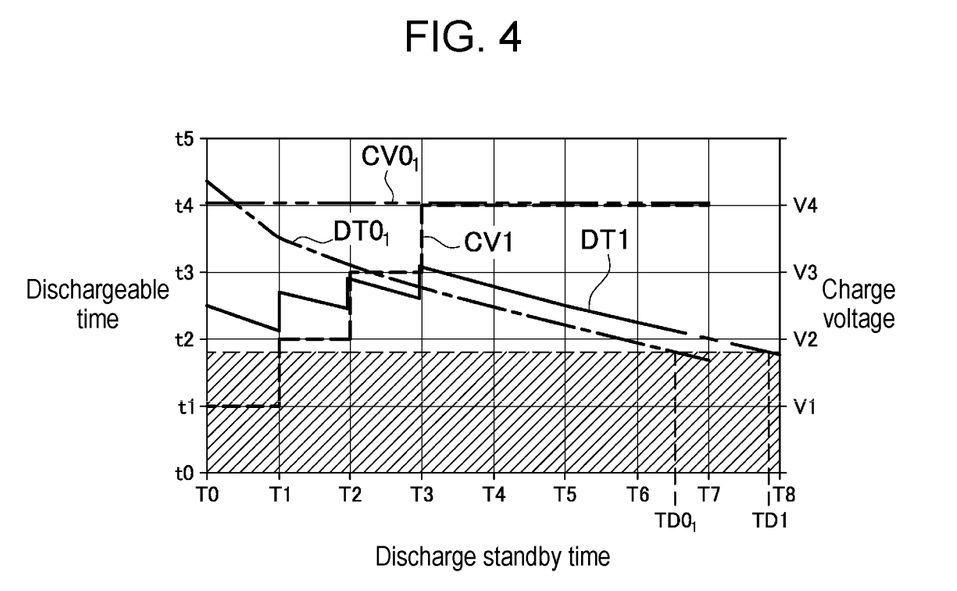
FIG. 4 is a graph showing changes in dischargeable time and charge voltage with respect to discharge standby time of a secondary battery at temperature TP1 regarding charging methods according to Example 1 and Comparative Example 1.

Next, the charge control according to Example 1 will be described on the basis of the graph of FIG. 4. FIG. 4 shows a state in which dischargeable time DT1, DT0$_1$ (left vertical axis) of the secondary batteries at certain temperature TP1 becomes shorter with the lapse of the discharge standby time (horizontal axis) and a state in which charge voltage CV1, CV0$_1$ (right vertical axis) is changed with the lapse of the discharge standby time (horizontal axis) regarding the charging methods according to Example 1 and Comparative Example 1. Further, the dischargeable time (necessary power amount) required per cell is indicated by hatching corresponding to the load request power amount requested by the load connected to standby power supply device 100. In FIG. 4, the dischargeable time of the secondary batteries according to Example 1 is denoted by DT1, the dischargeable time of the secondary batteries according to Comparative Example 1 is denoted by DT0$_1$, the charge voltage of the secondary batteries according to Example 1 is denoted by CV1, and the charge voltage according to Comparative Example 1 is denoted by CV0$_1$. As shown in this drawing, the dischargeable time gradually decreases with time. Here, in Comparative Example 1, the charge voltage is fixed at CV0$_1$ regardless of the discharge standby time. As a result, when the lapse of time reaches TD0$_1$, the necessary capacity cannot be supplied, and the life is reached.

On the other hand, according to the charging method of Example 1, charge voltage CV1 is changed according to deterioration rate SOH of the secondary batteries as indicated by the curve in the drawing. Since deterioration rate SOH decreases with time, the charge voltage increases with time. For example, in the period from lapsed time T0 to T1 at the left end of FIG. 4, charge voltage CV1 is considerably smaller than charge voltage $CV0_1$ of the charging method according to Comparative Example 1. As a result, since the capacity charged in the secondary batteries is smaller than the capacity in Comparative Example 1, dischargeable time DT1 according to Example 1 is also smaller than dischargeable time $DT0_1$ of Comparative Example 1. However, since the necessary capacity indicated by hatching is not reached, it is possible to supply necessary power to the load.

The standby power supply device according to Example 1 also deteriorates with time, and dischargeable time DT1 also shows a downward gradient. Therefore, before dischargeable time DT1 reaches the necessary capacity, charge voltage CV1 is increased to increase dischargeable time DT1. Here, deterioration degree SOH of secondary batteries 1 is detected by controller 4, and before reaching the necessary capacity, preferably when reaching a lower limit value obtained by adding a margin to the necessary capacity, voltage adjuster 3 is controlled to increase charge voltage CV1. In the example of FIG. 4, charge voltage CV1 is increased to increase dischargeable time CV1 at the time point of reaching lapsed time T1. Hereinafter, the same control is repeated to increase charge voltage CV1 according to deterioration degree SOH of the secondary batteries. Thus, although dischargeable time DT1 becomes shorter with time, that is, DT1 decreases, the decrease can be suppressed by increasing charge voltage CV1. Thus, charge voltage CV1 of the secondary batteries is suppressed to be low, so that deterioration can be suppressed and the life can be extended. In the example of FIG. 4, dischargeable time DT1 of Example 1 exceeds dischargeable time $DT0_1$ of Comparative Example 1 at lapsed time T3, and the lapse of time to finally reach the necessary capacity can be extended to TD1.

Figure 5:
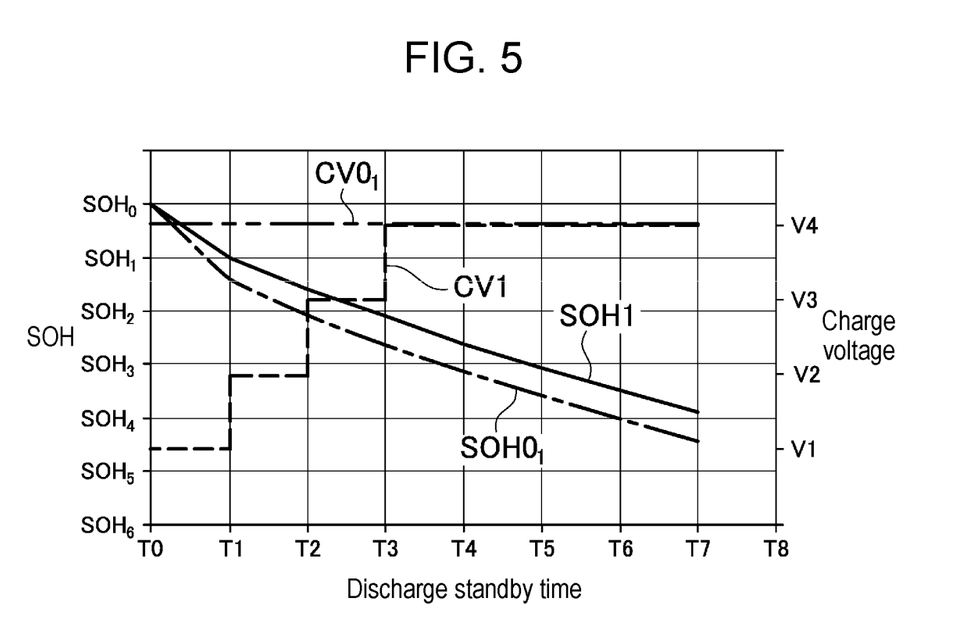
FIG. 5 is a graph showing changes in degree of deterioration and charge voltage with respect to discharge standby time of a secondary battery at temperature TP1 regarding charging methods according to Example 1 and Comparative Example 1.

Here, the deterioration suppression according to Example 1 under the conditions of FIG. 4 is shown in the graph of FIG. 5. This drawing shows a state in which deterioration degree SOH1, $SOH0_1$ (left vertical axis) of the secondary batteries at the same temperature TP1 as in FIG. 4 decreases with the lapse of the discharge standby time (horizontal axis) and a state in which charge voltage CV1, $CV0_1$ (right vertical axis) is changed with the lapse of the discharge standby time (horizontal axis) regarding the charging methods according to Example 1 and Comparative Example 1. As shown in this drawing, it is found that deterioration degree SOH1 of the secondary batteries by the charging method of Example 1 is smaller than deterioration degree $SOHO_1$ of the secondary batteries by the charging method of Comparative Example 1. As described above, it has been confirmed that the expected life of the battery can be extended in the case of the same temperature as compared with the conventional charging method.

(Charge Control According to Example 2)

Figure 6:
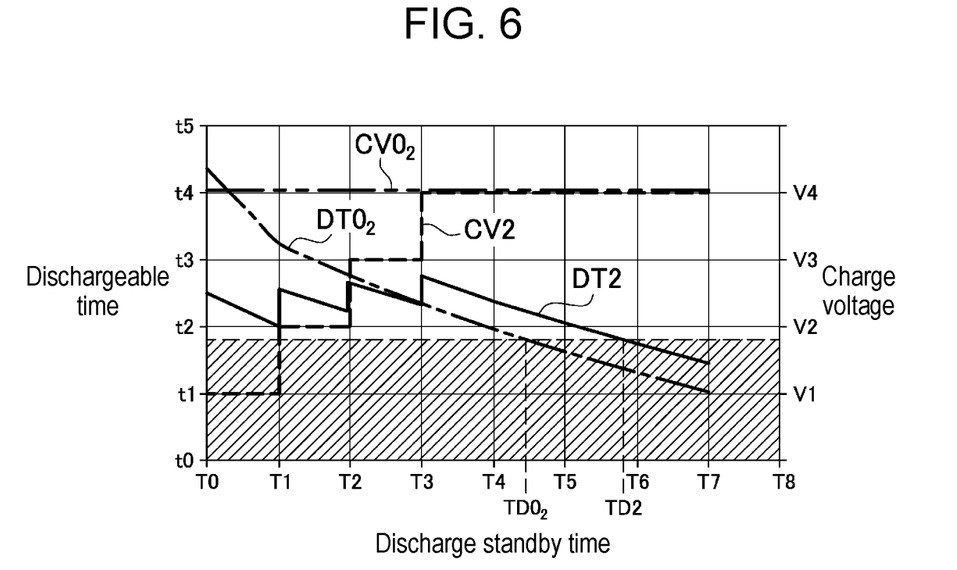
FIG. 6 is a graph showing changes in dischargeable time and charge voltage with respect to discharge standby time of a secondary battery at temperature TP2 regarding charging methods according to Example 2 and Comparative Example 2.
Figure 7:
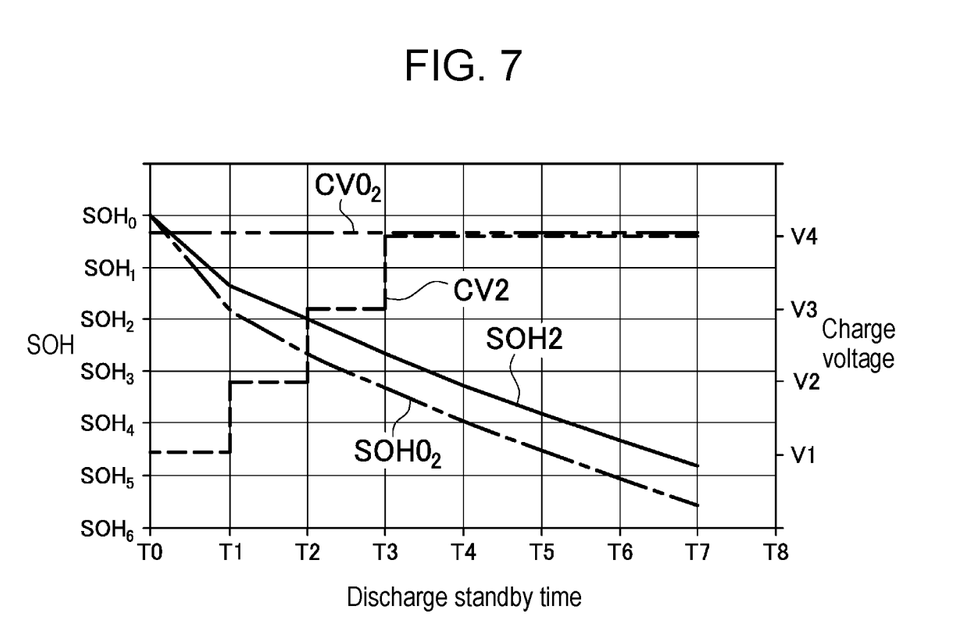
FIG. 7 is a graph showing changes in degree of deterioration and charge voltage with respect to discharge standby time of a secondary battery at temperature TP2 regarding charging methods according to Example 2 and Comparative Example 2.

Similarly, the charge control at temperature TP2 higher than temperature TP1 is shown in the graphs of FIGS. 6 and 7 as Example 2. FIG. 6 shows a state in which dischargeable time DT2, $DT0_2$ (left vertical axis) of the secondary batteries at temperature TP2 becomes shorter with the lapse of the discharge standby time (horizontal axis) and a state in which charge voltage CV2, $CV0_2$ (right vertical axis) is changed with the lapse of the discharge standby time (horizontal axis) regarding the charging methods according to Example 2 and Comparative Example 2. Similar to FIG. 4, the dischargeable time of the secondary batteries according to Example 2 is denoted by DT2, the dischargeable time of the secondary batteries according to Comparative Example 2 is denoted by $DT0_2$, the charge voltage of the secondary batteries according to Example 2 is denoted by CV2, the charge voltage according to Comparative Example 2 is denoted by $CV0_2$, and the requested dischargeable time (necessary power amount) is indicated by hatching. Further, in Comparative Example 2, the charge voltage is also fixed at $CV0_2$ regardless of the discharge standby time. As a result, when the lapse of time reaches $TD0_2$, the necessary capacity cannot be supplied, and the life is reached.

On the other hand, according to the charging method of Example 2, charge voltage CV2 is increased according to deterioration rate SOH of the secondary batteries as indicated by the curve in the drawing.

For example, in the period from lapsed time T0 to T1 at the left end of FIG. 6, charge voltage CV2 is considerably smaller than charge voltage $CV0_2$ of the charging method according to Comparative Example 2. As a result, since the capacity charged in the secondary batteries is smaller than the capacity in Comparative Example 2, dischargeable time DT2 according to Example 2 is also smaller than dischargeable time $DT0_2$ of Comparative Example 2. However, since the necessary capacity indicated by hatching is not reached, it is possible to supply necessary power to the load.

The standby power supply device according to Example 2 also deteriorates with time, and dischargeable time DT2 also shows a downward gradient. Therefore, before dischargeable time DT2 reaches the necessary capacity, charge voltage CV2 is increased to increase dischargeable time DT2. In the example of FIG. 6, charge voltage CV2 is increased to increase dischargeable time DT2 at the time point of reaching lapsed time T1. Hereinafter, the same control is repeated to increase charge voltage CV2 according to deterioration degree SOH of the secondary batteries. Thus, although dischargeable time DT2 becomes shorter with time, that is, DT2 decreases, the decrease can be suppressed by increasing charge voltage CV2. Thus, charge voltage CV2 of the secondary batteries is suppressed to be low, so that deterioration can be suppressed and the life can be extended. In the example of FIG. 6, dischargeable time DT2 of Example 2 exceeds dischargeable time $DT0_2$ of Comparative Example 2 at lapsed time T3, and the lapse of time to finally reach the necessary capacity can be extended to TD2.

Further, the deterioration suppression according to Example 2 under the conditions of FIG. 6 is shown in the graph of FIG. 7. This drawing shows a state in which deterioration degree SOH2, $SOH0_2$ (left vertical axis) of the secondary batteries at the same temperature TP2 as in FIG. 6 decreases with the lapse of the discharge standby time (horizontal axis) and a state in which charge voltage CV2, $CV0_2$ (right vertical axis) is changed with the lapse of the discharge standby time (horizontal axis) regarding the charging methods according to Example 2 and Comparative Example 2. As shown in this drawing, it is found that deterioration degree SOH2 of the secondary batteries by the charging method of Example 2 is smaller than deterioration degree $SOH0_2$ of the secondary batteries by the charging method of Comparative Example 2. As described above, it has been confirmed that the expected life of the battery can be extended even when the temperature is increased as compared with the conventional charging method.

(High Temperature Resistance at the Same Life)

Figure 8:
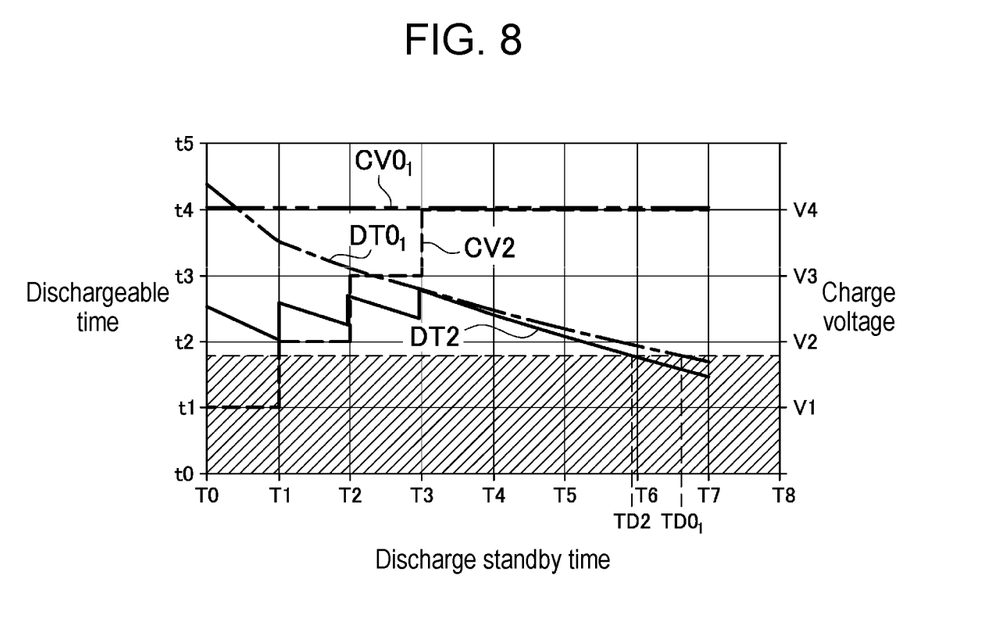
FIG. 8 is a graph showing changes in dischargeable time and charge voltage with respect to discharge standby time of a secondary battery regarding a charging method according to Example 2 at temperature TP2 and a charging method according to Comparative Example 1 at temperature TP1.
Figure 9:
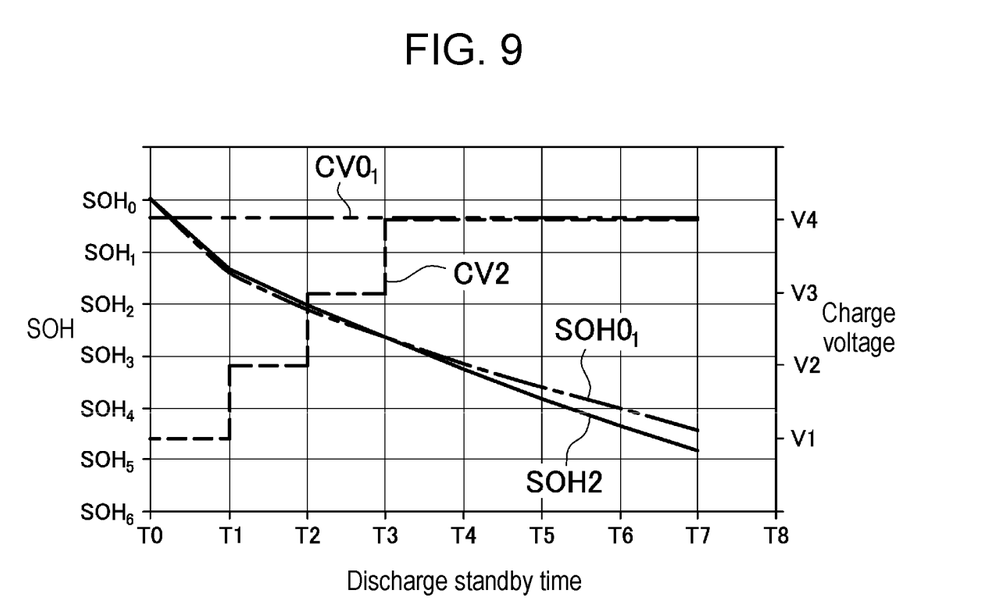
FIG. 9 is a graph showing changes in degree of deterioration and charge voltage with respect to discharge standby time of a secondary battery regarding a charging method according to Example 2 at temperature TP2 and a charging method according to Comparative Example 1 at temperature TP1.

As described above, it has been confirmed that the life extension suppressing the deterioration of the secondary batteries is measured by the charging method according to the exemplary embodiment. This is also understood to be secondary batteries that can withstand even more severe deterioration when the life is the same, in other words, secondary batteries that can be used even in a high-temperature environment and have increased temperature resistance. Therefore, Comparative Example 1 at temperature TP1 described above is compared with Example 2 at temperature TP2 higher than temperature TP1, and the results are shown in the graphs of FIGS. 8 and 9. In these drawings, FIG. 8 shows a state in which dischargeable time DT2, $DT0_1$ (left vertical axis) of the secondary batteries becomes shorter with the lapse of the discharge standby time (horizontal axis) and a state in which charge voltage CV2, $CV0_1$ (right vertical axis) is changed with the lapse of the discharge standby time (horizontal axis) regarding the charging method according to Example 2 at temperature TP2 and the charging method according to Comparative Example 1 at temperature TP1. Similar to FIGS. 4 and 6, the dischargeable time of the secondary batteries according to Example 2 is denoted by DT2, the dischargeable time of the secondary batteries according to Comparative Example 1 is denoted by $DT0_1$, the charge voltage of the secondary batteries according to Example 2 is denoted by CV2, the charge voltage according to Comparative Example 1 is denoted by $CV0_1$, and the requested dischargeable time (necessary power amount) is indicated by hatching. As a result, at the time point of reaching $TD0_1$ in Comparative Example 1, and at the time point of reaching TD2 in Example 2, the necessary capacity is reached and the life is reached. This difference is smaller than those in FIGS. 4 and 6, and can be regarded as approximately the same as the life in Comparative Example 1 where the temperature is low. In other words, it can be said that the life has been extended to the same extent as Comparative Example 1 at a low temperature even in a high-temperature environment where the life would otherwise be shorter. Conversely, when the life, that is, the degree of deterioration is about the same, secondary batteries having high heat resistance that can be used even in a high-temperature environment can be obtained.

Further, FIG. 9 shows a state in which deterioration degree SOH2, $SOH0_1$ (left vertical axis) of the secondary batteries decreases with the lapse of the discharge standby time (horizontal axis) and a state in which charge voltage CV2, $CV0_1$ (right vertical axis) is changed with the lapse of the discharge standby time (horizontal axis) regarding the charging method according to Example 2 at temperature TP2 and the charging method according to Comparative Example 1 at temperature TP1. As shown in this drawing, it is found that deterioration degree SOH2 of the secondary batteries according to Example 2 in a higher temperature environment is suppressed to about the same degree as deterioration degree $SOH0_1$ of the secondary batteries by the charging method of Comparative Example 1 at a low temperature. As described above, it has been confirmed that the high heat resistance has been obtained from the viewpoint of the degree of deterioration by the charging method according to the exemplary embodiment.

Second Exemplary Embodiment

In the charging method according to the first exemplary embodiment (Examples 1 and 2) described above, the method of detecting the degree of deterioration of secondary batteries 1 with controller 4 and controlling voltage adjuster 3 to increase the charge voltage is adopted. However, in the present invention, the reference for changing the charge voltage is not limited to the degree of deterioration of the secondary batteries. For example, parameters such as SOC, battery temperature, charge and discharge current, and temperature may be used. These are parameters used when the degree of deterioration of the battery is calculated, and in other words, even when the degree of deterioration of the battery is not calculated on the basis of these parameters, the same result can be obtained by controlling using the value of each parameter or a combination thereof. That is, the present invention includes not only an aspect in which the degree of deterioration of the battery is calculated as a numerical value or control is performed on the basis of the degree of deterioration, but also an aspect in which it is determined that the timing at which the charge voltage is changed, here, increased, is reached at the time point when a predetermined combination is reached substantially on the basis of a table, a simulation result, or the like calculated and determined in advance from parameters such as the temperature, the current, and the voltage of the battery.

Furthermore, in addition to detecting and monitoring the current, the voltage, the temperature, and the like in the actual operation state and changing the charge voltage, the degree of deterioration predicted under the use environment assumed in advance may be predicted, and the charge voltage may be controlled to change according to the predicted degree of deterioration. In this case, it is not necessary to actually detect the temperature, the voltage, and the like when the charge voltage changes, and the charge voltage is automatically increased assuming that predetermined deterioration has progressed after a lapse of a scheduled time. According to this method, it is not necessary to detect the state of each secondary battery in order to change the charge voltage, so that it is possible to obtain an advantage that control and processing for changing the charge voltage can be made significantly light load. In this case, the degree of deterioration of the secondary batteries assumed in advance is held by actual measurement, simulation, or the like, and this is regarded as a function of time, and the charge voltage is changed at the timing when the assumed deterioration is reached. In this manner, the preset deterioration time of the secondary batteries is referred to as the discharge standby time in the present specification. The charging method for changing the charge voltage using the discharge standby time will be described as a charging method of the standby power supply device according to the second exemplary embodiment. Here, the predicted deterioration of secondary batteries 1 is associated with the change in charge voltage in advance, and the timing at which the charge voltage is changed from the start of use of secondary batteries 1 is set as the discharge standby time, and is held in controller 4 as a table or data. Further, the discharge standby time may be set in units of secondary battery cells, or may be set for the entire battery unit in which a plurality of secondary battery cells is combined. Then, controller 4 detects the discharge standby time of secondary batteries 1 and controls voltage adjuster 3. The lapse of time from the start of use of secondary batteries 1 can be detected by timer 6 or the like. Then, similar to the first exemplary embodiment, voltage adjuster 3 charges secondary batteries 1 at charge voltage Vc lower than full charge voltage Vf of secondary batteries 1 to bring secondary batteries 1 into a load power supply standby state, and gradually increases charge voltage Vc of secondary batteries 1 according to the discharge standby time of secondary batteries 1 detected by controller 4. Thus, similar to the first exemplary embodiment described above, at the start of use of secondary batteries 1, the charge voltage is suppressed to suppress heat generation, and the life can be extended while power supply to the load is guaranteed. Note that charging circuit 2 charges secondary batteries 1 with a power amount exceeding the load request power amount requested by the load connected to standby power supply device 100 to bring secondary batteries 1 into the load power supply standby state.

Note that deterioration degree SOH of the secondary batteries is obtained from, for example, an equation described below.

$$SOH = Crd/Cf \times 100$$

(Crd: remaining capacity [Ah]; Cf: full charging capacity [Ah])

Further, the degree of deterioration may be obtained from remaining capacity state of charge (SOC) of the secondary batteries. SOC is obtained from, for example, an equation described below.

$$SOH = Crd/Cf \times 100$$

Figure 10:
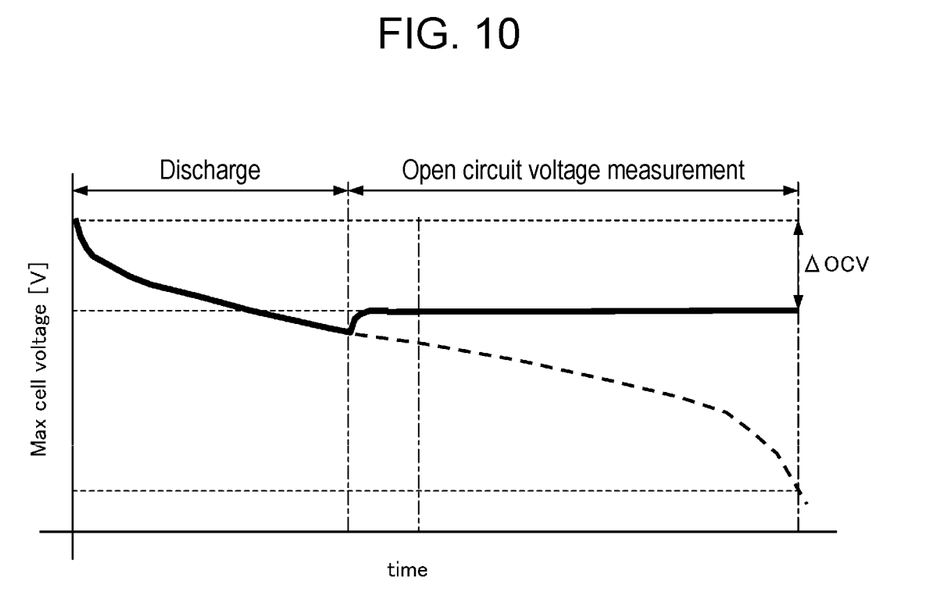
FIG. 10 is a graph showing an example of a method for estimating SOH.

As a method for estimating SOH, a known method can be appropriately used. For example, as shown in FIG. 10, the secondary batteries are discharged from a fully charged state to a predetermined level. For example, the discharge is performed until depth of discharge (DOD) reaches a predetermined value. Then, after waiting until open circuit voltage OCV of the secondary batteries is stabilized, SOH is calculated from voltage difference ΔOCV before and after discharge. Here, since OCV–SOC does not depend on deterioration, ΔOCV is converted into ΔSOC. Then, FCC [Wh] is calculated from ΔSOC and discharged capacity Q[Wh] using an equation described below.

$$FCC = Q \times 100/\Delta SOC$$

Moreover, from calculated FCC[Wh] and initial capacity DC of the secondary batteries, deterioration degree SOH of secondary batteries 1 is obtained by an equation described below.

$$SOH = FCC/\text{initial capacity } DC$$

In order to estimate SOH by the above method, charging circuit 2 of standby power supply device 100 shown in FIG. 1 includes discharging circuit 11 for discharging secondary batteries 1 after secondary batteries 1 are fully charged. Discharging circuit 11 shown in FIG. 1 includes a series circuit of current adjustment resistor 12 and switch 13, and is connected in parallel to battery unit 9. Deterioration degree detector 5 of controller 4 calculates discharged capacity Q[Wh] from the discharge current and the discharge time of secondary batteries 1 in a state where switch 13 of discharging circuit 11 is controlled to be turned on. Moreover, deterioration degree detector 5 calculates SOH from ΔSOC obtained from difference ΔOCV of the open circuit voltage of secondary batteries 1. As described above, deterioration degree detector 5 of controller 4 detects deterioration degree SOH of secondary batteries 1 at a predetermined cycle as time elapses.

INDUSTRIAL APPLICABILITY

The standby power supply device and the method for charging a secondary battery of the present invention can be appropriately used for applications including a backup power supply device for a data center, wireless base stations of, for example, cellular phones, a power storage device combined with a solar battery, such as a power storage power source for homes and factories or a power source for street lights, and a backup power source for traffic lights.

REFERENCE MARKS IN THE DRAWINGS

100: standby power supply device
1: secondary battery
2: charging circuit
3: voltage adjuster
4: controller
5: deterioration degree detector
6: timer
7: microcontroller
8: rectifier circuit
9: battery unit
11: discharging circuit
12: current adjustment resistor
13: switching element
14: charge current detector
15: temperature sensor
16: output line
17: diode
20: load
30: commercial power supply
40: main power supply

The invention claimed is:

1. A standby power supply device comprising:
a secondary battery; and
a charging circuit that charges the secondary battery, wherein
the charging circuit includes:
a voltage adjuster that controls a state of charge of the secondary battery; and
a controller that controls the voltage adjuster by detecting a degree of deterioration of the secondary battery over time, and
the voltage adjuster charges the secondary battery at charge voltage Vc lower than full charge voltage Vf of the second battery into a load power supply standby state, and gradually increases charge voltage Vc of the secondary battery according to the degree of deterioration of the second battery detected by the controller,
wherein the degree of deterioration of the secondary battery is detected from state of health (SOH) of the secondary battery, and
wherein the controller increases the charge voltage Vc when the state of health (SOH) decreases by a predetermined value or more, or a difference between the state of health (SOH) and a necessary capacity becomes a predetermined value or less.

2. A standby power supply device comprising:
a secondary battery; and
a charging circuit that charges the secondary battery, wherein
the charging circuit includes:
a voltage adjuster that controls a state of charge of the secondary battery; and
a controller that controls the voltage adjuster by detecting a discharge standby time of the secondary battery, and
the voltage adjuster charges the secondary battery at charge voltage Vc lower than full charge voltage Vf of the secondary battery into a load power supply standby state, and gradually increases charge voltage Vc of the secondary battery according to the discharge standby time of the secondary battery detected by the controller,
wherein the discharge standby time represents an elapsed time from the start of use of the secondary battery, and
wherein the charge voltage Vc is adjusted according to both of the detected discharge standby time and a degree of deterioration of the secondary battery.

3. The standby power supply device according to claim 1, wherein the charging circuit charges the secondary battery with a power amount exceeding a load request power amount requested by a load connected to the standby power supply device into the load power supply standby state.

4. A method for charging a secondary battery included in a standby power supply device, the method comprising: detecting a degree of deterioration of the secondary battery over time and gradually increasing charge voltage Vc of the secondary battery according to the detected degree of deterioration within a range lower than full charge voltage Vf of the secondary battery,
    wherein the degree of deterioration of the secondary battery is detected from state of health (SOH) of the secondary battery, and
    wherein the controller increases the charge voltage Vc when the state of health (SOH) decreases by a predetermined value or more, or a difference between the state of health (SOH) and a necessary capacity becomes a predetermined value or less.

5. The method for charging a secondary battery according to claim 4, the method comprising charging the secondary battery with a power amount exceeding a load request power amount requested by a load to which power is supplied from the secondary battery into a load power supply standby state.

6. A method for charging a secondary battery included in a standby power supply device, the method comprising: detecting a discharge standby time of the secondary battery and gradually increasing charge voltage Vc of the secondary battery according to the detected discharge standby time within a range lower than full charge voltage Vf of the secondary battery,
    wherein the discharge standby time represents an elapsed time from the start of use of the secondary battery, and
    wherein the charge voltage Vc is adjusted according to both of the detected discharge standby time and a degree of deterioration of the secondary battery.

\* \* \* \* \*